United States Patent [19]

Cimino et al.

[11] Patent Number: 4,899,391
[45] Date of Patent: Feb. 6, 1990

[54] AUTOMATIC KEY IDENTIFICATION SYSTEM

[76] Inventors: William J. Cimino, 325 Rice Ave., Revere, Mass. 02151; Robert E. Powers, Jr., 188 Faywood Ave., E. Boston, Mass. 02128

[21] Appl. No.: 212,342

[22] Filed: Jun. 24, 1988

[51] Int. Cl.⁴ .............................................. G06K 9/00
[52] U.S. Cl. .......................................... 382/1; 382/2; 382/8; 358/93; 358/101; 340/680
[58] Field of Search ............... 382/1, 2, 8; 358/93, 358/107, 101; 409/903, 225, 81, 82; 340/680

[56] References Cited

U.S. PATENT DOCUMENTS

| | | | |
|---|---|---|---|
| 3,865,011 | 2/1975 | Patriquin | 409/83 |
| 4,051,748 | 10/1977 | Sherman | 409/81 |
| 4,090,303 | 5/1978 | Uyeda | 409/81 |
| 4,143,582 | 3/1979 | Heimann | 409/83 |
| 4,614,465 | 9/1986 | Wu | 409/81 |
| 4,717,294 | 1/1988 | Grasser | 409/81 |
| 4,805,224 | 2/1989 | Koezuka et al. | 382/8 |
| 4,809,341 | 2/1989 | Matsui et al. | 382/8 |

Primary Examiner—Leo H. Boudreau
Assistant Examiner—Michael Razavi
Attorney, Agent, or Firm—Lahive & Cockfield

[57] ABSTRACT

A system for identifying and matching key blanks when duplicating an original key. A key holder is provided which positions the key horizontally along its longitudinal axis with the key's flat sides in a vertical plane. A lensing subsystem lights and forms an image of the front profile of the key. A video camera converts the light image into an electrical signal which is digitized and stored in computer memory. The computer compares the key image with stored images of known key blanks and signals the locksmith by means of an output subsystem the proper key blank to be used in duplicating the key.

18 Claims, 6 Drawing Sheets

AUTOMATIC KEY IDENTIFICATION SYSTEM

BACKGROUND OF THE INVENTION

This invention relates to duplication of keys, and more particularly to a system for identifying key blanks.

It is well known in the key art that key manufacturers code their key blanks in a unique and predetermined manner, each manufacturer having one or more code systems distinguished from all other manufacturers. The code systems used generally are comprised of a plurality of horizontal grooves and indentations of varying shapes, depths and spacing therebetween.

The most time consuming aspect of duplicating keys involves selection of the proper key blank matching the blank from which the original key was made. Typically, the locksmith has 50 to 300 various blanks to choose from. A mismatched key blank will not fit into the lock for which the original key was made even though the vertical notches of the duplicate key match the vertical notches of the original key. Not only is the process of matching key blanks time consuming, it generally takes from three to six months of training for a locksmith to acquire the skills to properly match a key blank to an original key within a reasonable amount of time.

There is thus a need for means for quickly and easily identifying the proper manufacturer's key blank to be used in duplicating an original key.

SUMMARY OF THE INVENTION

It is an object of this invention to reduce locksmith error in selecting properly matching key blanks.

It is a further object of the invention to reduce the amount of locksmith training and time necessary to properly match key blanks.

It is still another object of this invention to provide a system which will quickly and accurately identify the proper key blank necessary in duplicating an original key.

It is still further an object of this invention to provide a system for automatically identifying the appropriate key blank from an original key having horizontal grooves and indentations of a predetermined coded depth and spacing.

These and other objects are preferably accomplished by providing a holding device, into which a key is inserted; a lensing subsystem which lights and forms an image of the front profile of the key; a video subsystem which converts the light image from the lensing subsystem into an electrical signal; a digitizer which converts the output of the video subsystem into a digital image; a computer subsystem which stores the digital image into memory, processes the image and compares it to stored images of known keys; and an output subsystem which identifies to the locksmith the proper key blank to be used in duplicating the key.

Other and further objects, as well as various advantages and features of novelty which characterize the invention, are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

DETAILED DESCRIPTION OF THE INVENTION

Figure 2A:
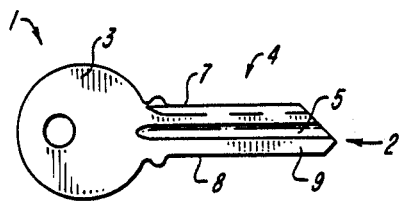
FIGS. 2A, 2B, and 2C are a side elevational view of a key blank, a side elevational view of said key blank notched, and a front elevational view of said key blank.
Figure 2B:
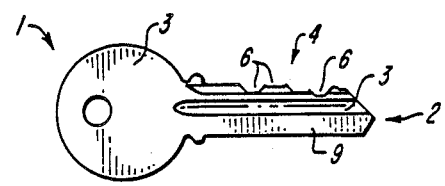
Figure 2C:
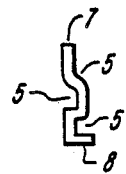
Figure 3A:
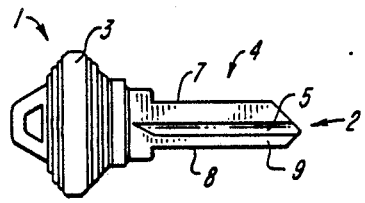
FIGS. 3A and 3B are side and front elevational views, respectively, of an Unican key blank.
Figure 4A:
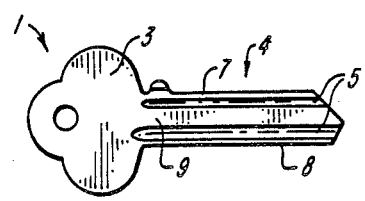
FIGS. 4A and 4B are side and front elevational views, respectively, of an Ilco key blank.
Figure 3B:
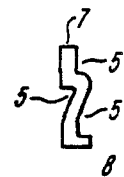
Figure 4B:
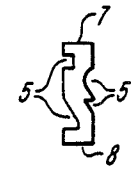
Figure 5A:
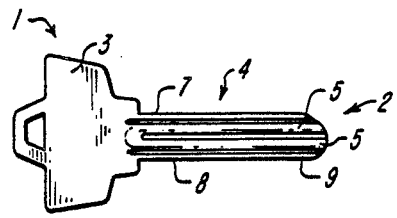
FIGS. 5A and 5B are side and front elevational views, respectively, of another Ilco key blank.
Figure 5B:
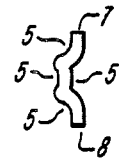
Figure 6A:
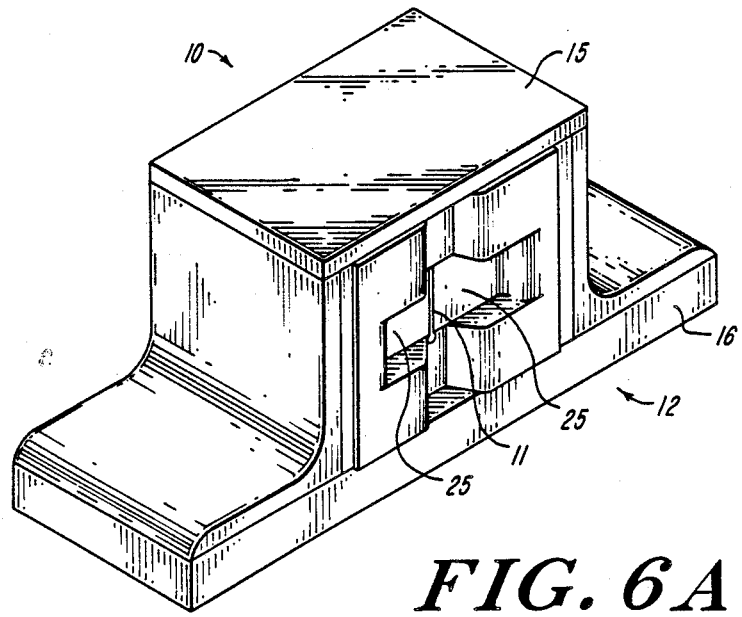
FIGS. 6A and 6B are rear and front perspective views, respectively, of the key holder portion of the present invention.
Figure 6B:
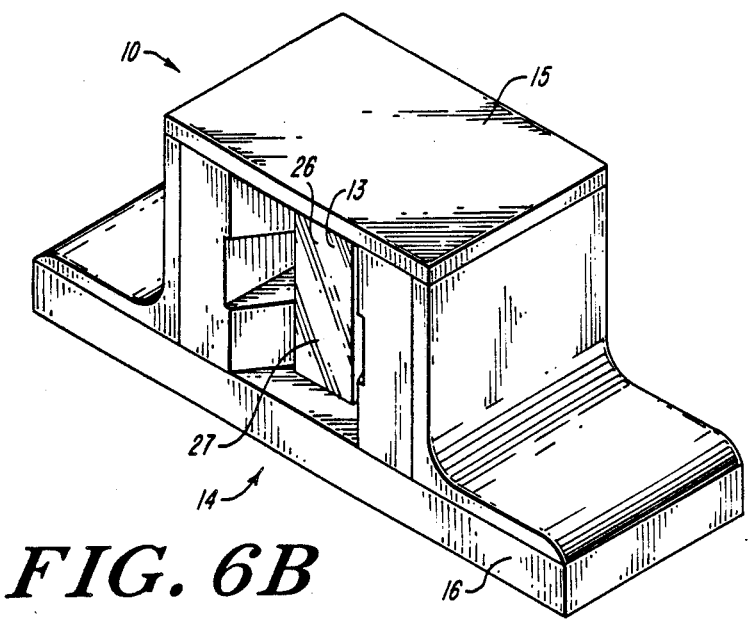
Figure 7A:
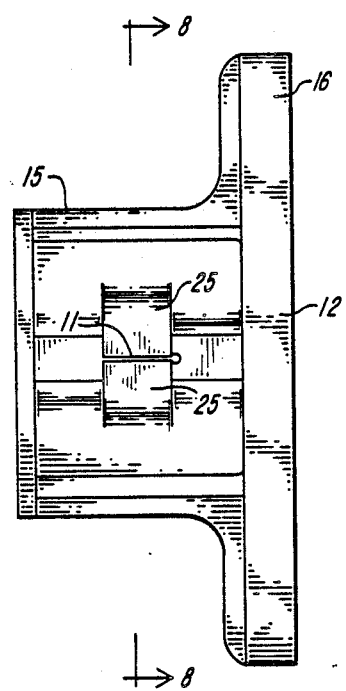
FIGS. 7A and 7B are rear and front elevational views, respectively, of the key holder of FIGS. 6A and 6B.
Figure 7B:
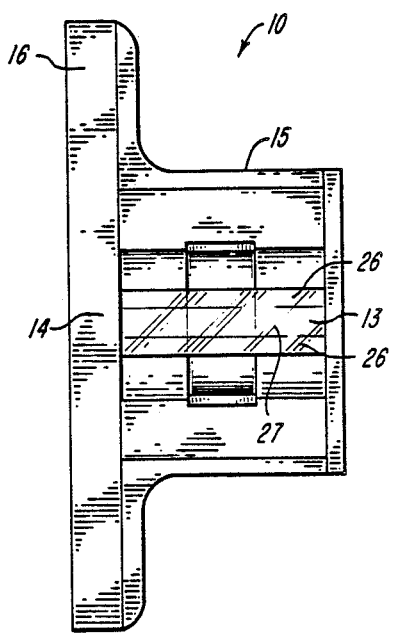
Figure 8:
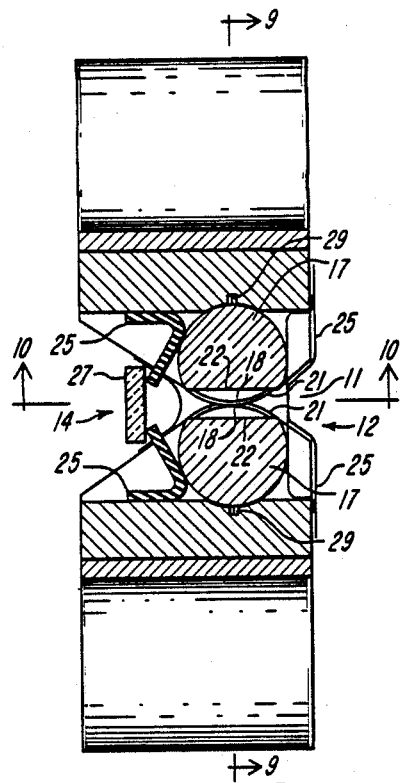
FIG. 8 is a sectional view along the line 8—8 of FIG. 7A.

A standard key 1 as shown in FIGS. 2A, 2B and 2C has a head 3 and a shank 4. For purposes of explanation, the flat sides 9 of the shank 4 are positioned vertically and the shank 4 is extended horizontally in relationship to the head 3. Along the flat sides 9 of the shank 4 are grooves and indentations 5. The grooves and indentations 5 are unique to individual manufacturers. The vertical notches 6 along the top 7 of the shank 4 and, at times, along the bottom 8 of the shank 4, transform the key blank of FIG. 2A into a key 1 uniquely notched for a particular lock. The manufacturer's unique coding system of grooves and indentations 5 are most easily identified in a head-on view of the front 2 of the shank 4 as shown in FIG. 2C. It is this front 2 view which provides the distinctive features which allow the present invention to distinguish key blanks among manufacturers and among specific manufacturer's product lines. FIGS. 3A and 3B, FIGS. 4A and 4B, and FIGS. 5A and 5B provide examples of key blanks made by Unican, Ilco #1 and Ilco #2, respectively, and illustrate the uniqueness of the head-on views of each. The key 1 used in FIGS. 2A, 2B and 2C was an American Lock Co. key. The salient characteristics of the front 2 view of a key shank 4 is that the cross-sectional profile is unique and independent of the vertical notches 6 extending along the top 7 and/or bottom 8 of the shank 4, thereby allowing a precisely matched key blank for use in duplicating a key 1.

Figure 1:
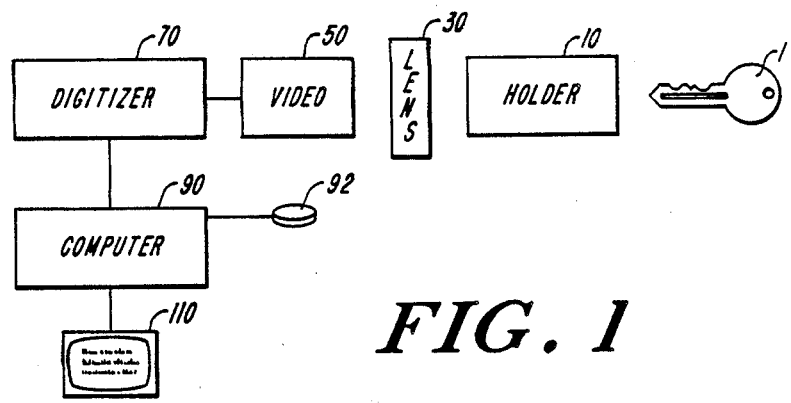
FIG. 1 is a system block diagram of the present invention.

Referring more particularly to the drawings in detail wherein like numerals indicate like elements, there is shown in FIG. 1 an automatic key identification system comprised of a key holder subsystem 10, a lensing subsystem 30, a video subsystem 50, a digitizing subsystem 70, a computer subsystem 90, and an output subsystem 110. The key 1 to be duplicated is inserted into the key holder 10. The lensing subsystem 30 illuminates the front 2 of the key 1 forming a cross-sectional image 35 thereof. The video subsystem 50 converts the image 35 into an electrical signal which the digitizing subsystem 70 converts into a digital image. The digital image is passed to the computer subsystem 90 which stores the digital image into its memory 95, processes the digital image and compares it to stored digital images of known keys. When a match is made between the image and a stored image, the locksmith is told via the output subsystem 110 of the proper key blank to be used in duplicating the key 1.

Figure 9:
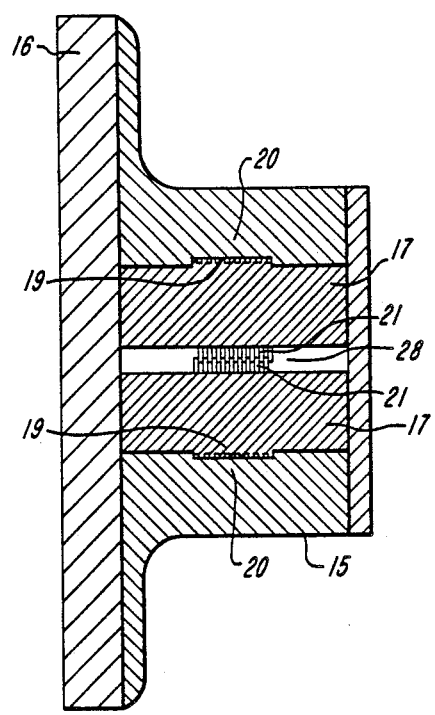
FIG. 9 is a sectional view along the line 9—9 of FIG. 8.
Figure 10:
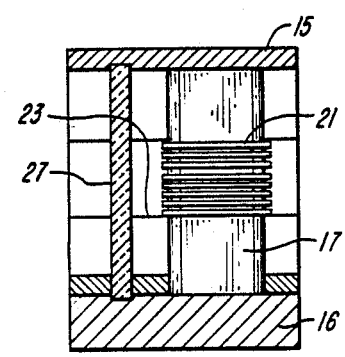
FIG. 10 is a sectional view along the line 10—10 of FIG. 8.
Figure 11:
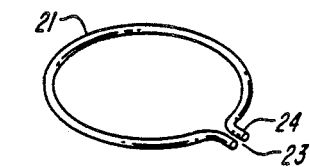
FIG. 11 is a perspective view of the spring element of FIGS. 8, 9 and 10.

The key holder subsystem 10 is most clearly shown in FIGS. 6A, 6B, 7A, 7B, 8, 9 and 10. The purpose of the key holder subsystem 10 is to hold a generally bladed object with grooves and indentations along its sides in a true horizontal position with the bladed object's flat sides in a generally vertical plane, all in relationship to the holder 10. In this particular application the key shank 4 is the blade and is inserted front 2 first into the vertical aperture 11 at the rear 12 of the key holder 10, shown in a rear perspective view in FIG. 6A and a real elevational view in FIG. 7A. The key 1 is inserted until the shank front 2 meets a viewing glass 13 near to the front 14 of the holder 10, shown in a front perspective view in FIG. 6B and a front elevational view in FIG. 7B. The holder 10 has a housing 15 mounted on a horizontal base 16. Within the housing 15 are two vertical and parallel steel dowels 17 in a side-by-side relationship perpendicular to the front 14 and rear 12 of the holder 10. This may be most clearly understood by viewing the sectional view in FIG. 8, taken along the line 8—8 in FIG. 7A. An arc section 18 on each dowel-to-dowel facing side 22 of a dowel 17 is removed so that each dowel 17 has a flat portion 22 facing the other dowel 17. Uniformly spaced and parallel radial grooves 19 are etched about the center section 20 of each dowel 17. A plurality of round, single element springs 21 are positioned about each dowel's center section 20 and held within each dowel's radial grooves 19. Approximately fifteen to seventeen springs 21 are forced onto each dowel's center section 20. FIG. 10 illustrates the result on a single dowel 17 and FIG. 9 illustrates the dove-tail effect of the springs 21 from both dowels 17 across the flat faces 22 of the dowels 17. As may be best seen in FIG. 11 the spring elements 21 have a tubular radial circumference and are shaped into circles with one opening 23. Small lip elements 24 are formed at each opening 23 and aid in the placement of the springs 21 about the dowels 17 as well as keeping the springs 21 from rotating about the dowels 17 when in position. As may be best seen in FIG. 8, the housing 15 has vertical apertures 29 along side each dowel 17 for placement of the spring lip elements 24 when installing the springs 21 about each dowel 17. The net effect of this arrangement of springs 21 is that the key shank 4 is held in a horizontal alignment with the shank's flat sides 9 vertically positioned. The large number of springs 21 on each dowel 17 holds the shank sides 9 in and along the grooves and indentations 5 of the shank 4.

The key holder 10 orients and locates the front 2 of the key 1 with respect to the lensing subsystem 30. The key 1 is inserted through the rear aperture 11 of the holder 10, between the spring-encased dowels 17, up to the transparent viewing glass 13. Because of the spring 21 and dowel 17 structure, the key shank 4 is held in a true horizontal position with flat sides 9 in a vertical plane. The circular configuration of the springs 21 across the flat faces 22 of the dowels 17 ensures that only the springs 21 are in contact with the key shank 4. The design of the holder 10 is such that any key 1 in general use may be accomodated. The combined action of all of the springs 21 positions, orients and holds the key 1 in a trus horizontal position with respect to the holder 10.

Figure 12:
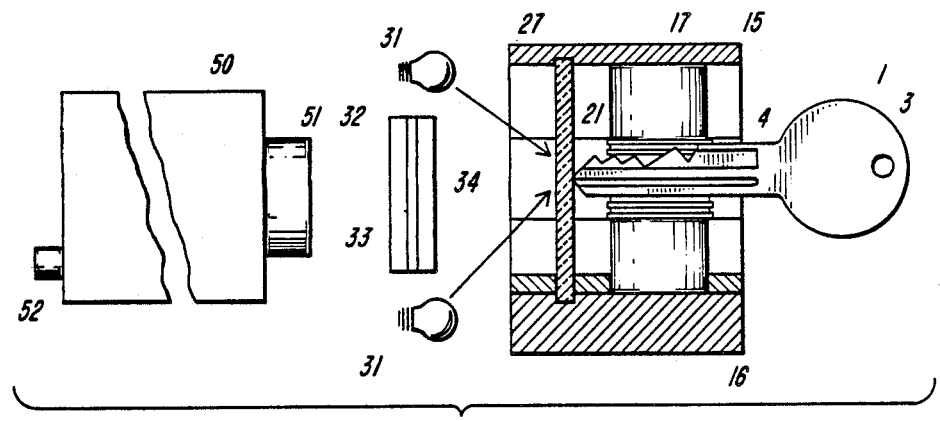
FIG. 12 is a side sectional view of the Lensing Subsystem of FIG. 1 interconnecting the key holder and video subsystems.

The lensing subsystem 30 is comprised of two or more light bulbs 31, a magnification lens 32, F-stop means 33 and a polarizing light filter 34. The output of the lensing subsystem 30 is an end-on cross-section image 35 of the front 2 of the key 1. The key 1 is inserted into the key holder 10 so that the front 2 of the key 1 touches the viewing glass 13 and is halted at a predetermined focal point. The lensing subsystem 30 is mounted forward 14 of the key holder 10. The light bulbs 31 are vertically juxtaposed on either side of the lens 32. The bulbs 31 illuminate the key front 2 at an approximate forty-five degree positive and negative vertical to the longitudinal axis of the key shank 4 as illustrated in FIG. 12. The light bulbs 31 are small and are powered by any convenient twelve volt power source.

The main source of error in the present invention is from extraneous glare and side glints from the key 1. To reduce error non-reflective shields 25 are positioned on either side of the rear aperture 11. The shields 25 block out external light from entering the key holder 10 and also act as a guide to keep the key 1 properly oriented until engaged by the dowel springs 21. Non-reflective shields 25 are also positioned across the forward portions of the dowel springs 21, the positioning of which may be best understood from FIG. 8. The springs 21 are also painted a non-reflective black. The viewing glass 13 is turned slightly on its vertical axis to avoid reflecting light back into the lens 32. Non-reflective black tape 26 is positioned in vertical strips on either side of the viewing glass vertical middle 27 to further reduce the bounce back of key glint. The polarizing light filter 34 positioned in front of the F-stop means 33 and magnification lens 32 further reduces glint and glare.

Figures 13, 14:
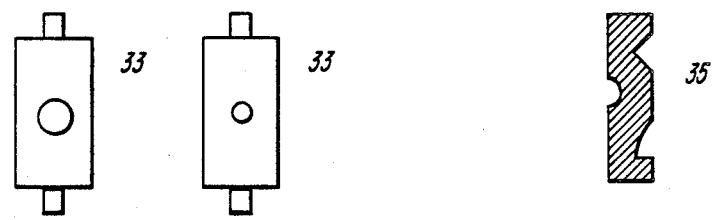
FIG. 13 are plan face views of the F-stop means of FIG. 12.
FIG. 14 illustrates a head-on profile of a key light image.

The F-stop means 33 illustrated in FIG. 13 provides for different depths of field as necessary to fully image the end-on cross-section of the front 2 of the key 1. Working depth of field is approximately one-half centimeter. The magnification lens 32 expands, magnifies and focuses the light image 35 at a point where it may be easily picked up by the video subsystem 50. FIG. 14 depicts an example of what the image 35 might be. It is only the cross-sectional edges which are of interest in the identification process.

As depicted in FIG. 12, the light image 35 is picked up by the input lens 51 of a conventional video camera which comprises the video subsystem 50. In this embodiment an RCA TC1501 video camera was used. The purpose of the video subsystem 50 is to convert the light image 35 from the lensing subsystem 30 to an electrical signal. This process is well known in the art and does not require fuller explanation here. In this particular embodiment, the camera 50 has a video output port 52 from which a video signal in the 1.0 to 1.4 volt (point to point) amplitude range is outputted. Resolution of this subsystem 50 is up to five hundred fifty vertical lines. Power is supplied to the video camera 50 from any convenient AC source.

The output from the video output port 52 is then passed to the digitizing subsystem 70. The digitizing subsystem 70 is a convention frame grabber and in this embodiment a Digital Vision "Computereyes" frame grabber module was used. The video output port 52 is connected to the digitizer's input connector 71. During every vertical scan period, the subsystem 70 takes in 192 samples. Thus, one column of 192 pixels, i.e., the smallest element of an image that can be individually processed in a video display system, is stored every vertical scan. Each vertical scan takes 16.6 milliseconds. An image is comprised of 320 columns. Therefore, a complete image scan requires a little under six seconds. This process is known in the art and does not require fuller explanation here. The digitizing subsystem's input/output port 72 is connected to the computer subsystem 90.

Figure 15A:
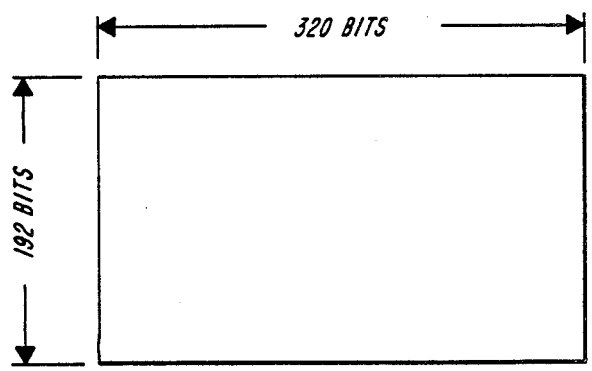
FIGS. 15A, 15B, 15C and 15D illustrate bit-mapped video frame matrices in computer memory.
Figure 15B:
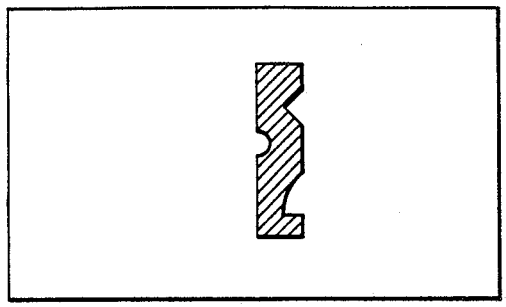
Figure 15C:
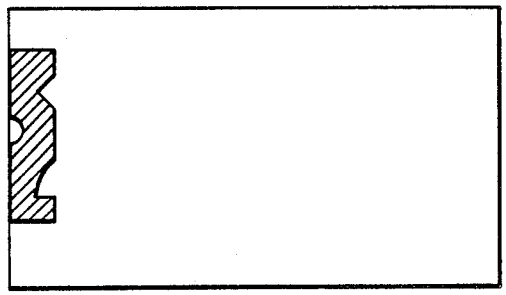
Figure 15D:
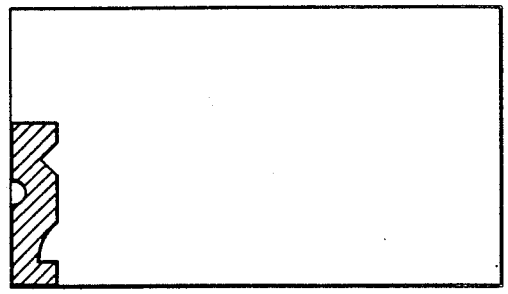

Software running in the computer subsystem 90 controls the acquisition of the image 35. The computer subsystem 90 sends a signal to initiate a digitizer scan. Following the scan an image is produced in the computer subsystem's Random Access Memory (RAM) 91. The image occupies 7,680 bytes in RAM 91. FIG. 15A illustrates a bit-mapped video frame matrix in memory. Each bit is "1" or "0" depending on whether the pixel is light or dark (single level digitization). The digitizer 70 sampled 320 columns of 192 bits each, which in the computer subsystem 90 is termed 192 lines of 320 bits each. FIG. 15B illustrates a typical bit-mapped image obtained by the digitizing subsystem 70 and stored in RAM 91. The computer subsystem 90 software scans the image line by line to determine the bit number of the left side and the right side of the image object. This operation defines the edges of the image object. In order to make the image independent of the position of the object in the field of view, the software corrects the bit numbers determined above by subtracting the extreme leftmost bit number from all bit numbers. The resultant image is illustrated in FIG. 15C. The image is further translated by correcting the line numbers so that the bottom of the image is at the bottom of the frame. FIG. 15D illustrates the resultant image.

The image is then either "saved" or "identified". If it is "saved", it is stored both in RAM 91 and disk 92 along with a label chosen by the user. If it is "identified", it is compared with "saved" images in RAM 91. The actual identification process is as follows. The bit values of the target image are subtracted from a saved image line by line. There will be 384 operations per saved image, i.e., 192 lines×2, for left and right bit values on each line. The absolute resultant values for the 384 operations are totalled. This process is repeated for each of the saved images. The total closest to zero, within a range preset by the user, is the statistical match. The matched saved image is then identified by table lookup and the results passed to the output subsystem 110. The general capacity of this embodiment of the invention is 300 saved images. However, this capacity can be easily expanded.

The output subsystem 110 can be of many forms. In this particular embodiment, the output subsystem 110 is a conventional CRT. Other embodiments could include a signal light at each position on a key blank storage board, with the matched blank being signalled to the locksmith by means of the light at a particular key blank's position.

It is understood that the above-described embodiment is merely illustrative of the application. For example, the entire scanning operation could be triggered by a switch in the key holder subsystem 10 as a key 1 is inserted into the rear aperture 11. Other embodiments may be readily devised by those skilled in the art which will embody the principles of the invention, and fall within the spirit and scope thereof.

We claim:

1. A system for identifying and matching key blanks when duplicating an original key, comprising:
   a holding device into which the original key is inserted;
   a lensing subsystem adjacent to said holding device which illuminates and forms an image of the front profile of said original key;
   a video subsystem adjacent to said lensing subsystem which converts said image into an electrical signal;
   a digitizer connected to said video subsystem which converts said electrical signal into a digital image;
   a computer subsystem, having memory, connected to said digitizer which stores said digital image into said memory, processes said stored image, compares said stored image to stored images of known key blanks, identifies the proper key blank to be used in duplicating said original key, and outputs said identification data; and
   an output subsystem which signals said identification data.

2. A system as recited in claim 1 wherein:
   said holding device positions said original key horizontally along its longitudinal axis with the key's flat sides in a vertical plane, all in relation to the holding device itself.

3. A system as recited in claim 2 wherein said holding device is comprised of:
   a horizontal base;
   a housing mounted on said base and having a front and rear;
   a vertical aperture in said housing rear;
   an opening in said housing front; and
   spring means within said housing for holding said original key.

4. A system as recited in claim 3 wherein said spring means are comprised of:
   two vertical and parallel dowels in a side-by-side relationship in a plane perpendicular to said housing front and rear; and
   a plurality of round, single-element springs positioned about each dowel's center section.

5. A system as recited in claim 4 wherein:
   each dowel has an arc section on each dowel-to-dowel facing side removed so that each dowel has a flat portion facing the other dowel.

6. A system as recited in claim 5 wherein:
   each dowel has radial grooves etched about its center section.

7. A system as recited in claim 6 wherein:
   each said spring is held within a said radial groove.

8. A system as recited in claim 7 wherein:
   the springs about one dowel dove-tail at a midpoint between dowels with the springs of the other dowel.

9. A system as recited in claim 8 wherein:
   each said spring has a tubular radial circumference and are shaped into circles.

10. A system as recited in claim 9 wherein said holding device is further comprised of:
a viewing glass positioned vertically near to, and in a plane approximately parallel to, the front of said housing.

11. A system as recited in claim 10 wherein:
said original key is inserted into said housing rear vertical aperture through to said viewing glass.

12. A system as recited in claim 11 wherein said lensing subsystem is comprised of:
a magnification lens adjacent to, and in a plane parallel to, said holding device housing front; and
a plurality of light sources vertically juxtaposed on either side of said lens and aimed at the front profile of said original key.

13. A system as recited in claim 12 wherein said lensing subsystem is further comprised of:
a polarizing light filter immediately adjacent to and in a plane parallel to said lens, and positioned between said lens and said holding device housing front.

14. A system as recited in claim 13 wherein said lensing subsystem is further comprised of:
F-stop means positioned between said lens and said filter.

15. A system as recited in claim 14 wherein:
non-reflective shields are positioned on either side of said housing rear vertical aperture and across the forward portions of said dowel springs.

16. A system as recited in claim 15 wherein:
said video subsystem is a video camera.

17. A system as recited in claim 16 wherein:
said digitizer is a video frame grabber.

18. A system as recited in claim 17 wherein:
said output subsystem is a cathode ray tube.

* * * * *